(12) United States Patent
Sata et al.

(10) Patent No.: US 7,667,712 B2
(45) Date of Patent: Feb. 23, 2010

(54) CHARACTER COLORING CONTROL METHOD, GAME DEVICE, AND INFORMATION STORAGE MEDIUM

(75) Inventors: Hironori Sata, Yokohama (JP); Masakazu Yorifuji, Yokohama (JP)

(73) Assignee: Namco Bandai Games Inc., Tokyo (JP)

( * ) Notice: Subject to any disclaimer, the term of this patent is extended or adjusted under 35 U.S.C. 154(b) by 441 days.

(21) Appl. No.: 11/637,819

(22) Filed: Dec. 13, 2006

(65) Prior Publication Data

US 2007/0155493 A1 Jul. 5, 2007

(30) Foreign Application Priority Data

Dec. 16, 2005 (JP) .............................. 2005-363895

(51) Int. Cl.
- G09G 5/02 (2006.01)
- G09G 5/00 (2006.01)
- G09G 5/36 (2006.01)
- G06T 13/00 (2006.01)
- G03F 3/08 (2006.01)
- H04N 1/40 (2006.01)
- G06K 9/34 (2006.01)

(52) U.S. Cl. ................ 345/589; 345/428; 345/653; 345/474; 345/549; 358/518; 358/461; 382/162; 382/163; 382/167; 382/254; 463/1; 463/33

(58) Field of Classification Search ......... 345/418–419, 345/426, 422, 428, 581–582, 589–593, 597, 345/600, 601, 604, 617–619, 653, 474, 549, 345/561, 551–552; 358/518–520, 448, 461; 382/162–163, 165, 167, 254, 274, 276, 282
See application file for complete search history.

(56) References Cited

U.S. PATENT DOCUMENTS

| | | | | |
|---|---|---|---|---|
| 5,565,913 A | * | 10/1996 | Matsui et al. | 348/228.1 |
| 5,600,437 A | * | 2/1997 | Erdentug | 356/237.1 |
| 5,751,349 A | * | 5/1998 | Matsui et al. | 348/228.1 |
| 5,992,748 A | * | 11/1999 | Takahashi et al. | 235/462.04 |

FOREIGN PATENT DOCUMENTS

JP 2001-167291 A 6/2001

OTHER PUBLICATIONS

"ESPN NFL Football 2k4" game for XBox, Ingram Entertainment, <www.amazon.com/ESPN-NFL-Football/dp/B0000ACP8S> Nov. 2003.
"FIFA Soccer 2004," game for GameCube, Electronic Arts, <www.amazon.com/ELECTRONIC-ARTS-NGEAG-014633146684-Soccer/dp/B00009X3V7>, Jan. 2004.
"EA Sports Rugby 2001," game for PC, Electronic Arts, <<www.gpstore.co.nz/Games/1455276.html>>, Sept. 2000.

* cited by examiner

*Primary Examiner*—Wesner Sajous
(74) *Attorney, Agent, or Firm*—Oliff & Berridge, PLC

(57) ABSTRACT

Whether or not a discoloring motion has been performed by a player character is determined, and a discoloration portion set for the determined discoloring motion is discolored. A discolored mark texture of which the discolored mark pattern is denser and of a thicker color is mapped as a current discoloration value set to the discoloration portion becomes larger. The current discoloration value is added and updated by a discoloration unit set based on the stadium in which the game is performed and the game day weather each time the discoloring motion is performed.

17 Claims, 13 Drawing Sheets

FIG. 9

| 651 | 652 |
|---|---|
| MOTION TYPE | MOTION CONTROL CONTENT |
| SLIDING 01 | SLIDES IN WITH LEFT LEG BENT AND RIGHT LEG EXTENDED |
| SLIDING 02 | SLIDES IN WITH RIGHT LEG BENT AND LEFT LEG EXTENDED |
| SLIDING 03 | SLIDES IN WITH BOTH LEGS EXTENDED |
| FALLING DOWN 01 | FALLS DOWN ON KNEES |
| FALLING DOWN 02 | FALLS ON BEHIND |
| ⋮ | ⋮ |

| | FR1 | FL1 | BR1 | BL1 | FR2 | FL2 | BR2 | BL2 |
|---|---|---|---|---|---|---|---|---|
| SLIDING 01 | × | × | ○ | ○ | × | ○ | ○ | × |
| SLIDING 02 | × | × | ○ | ○ | ○ | × | × | ○ |
| SLIDING 03 | × | × | ○ | ○ | × | × | ○ | ○ |
| FALLING DOWN 01 | ○ | ○ | × | × | × | × | × | × |
| FALLING DOWN 02 | × | × | ○ | ○ | × | × | × | × |
| JUMPING SIDEWAYS 01 | × | × | × | ○ | × | × | × | ○ |
| JUMPING SIDEWAYS 02 | × | × | ○ | × | × | × | ○ | × |
| ⋮ | ⋮ | ⋮ | ⋮ | ⋮ | ⋮ | ⋮ | ⋮ | ⋮ |

| 671 | 672 |
|---|---|
| CURRENT DISCOLO-RATION VALUE | TEXTURE TYPE |
| 3.0~5.9 | DISCOLORED MARK TEXTURE 01 |
| 6.0~8.9 | DISCOLORED MARK TEXTURE 02 |
| 9.0~11.9 | DISCOLORED MARK TEXTURE 03 |
| 12.0~14.9 | DISCOLORED MARK TEXTURE 04 |
| 15.0~17.9 | DISCOLORED MARK TEXTURE 05 |
| 18.0~20.9 | DISCOLORED MARK TEXTURE 06 |
| 21.0~23.9 | DISCOLORED MARK TEXTURE 07 |
| 24.0~26.9 | DISCOLORED MARK TEXTURE 08 |
| 27.0~29.9 | DISCOLORED MARK TEXTURE 09 |
| 30.0~ | DISCOLORED MARK TEXTURE 10 |

| 691 | 692 | 693 | 694 |
|---|---|---|---|
| STADIUM NAME | PITCH TYPE | STADIUM COEFFICIENT | DISCOLORED MARK COLOR |
| NATIONAL STADIUM | NATURAL TURF | 1.0 | GREEN |
| RIVERBED | GROUND | 2.0 | BROWN |
| ABC DOME | ARTIFICIAL TURF | 0.2 | GRAY |
| . | . | . | . |
| . | . | . | . |

| WEATHER | WEATHER COEFFICIENT |
|---------|---------------------|
| CLEAR | 1.0 |
| CLOUDY | 1.2 |
| RAIN | 2.0 |
| ⋮ | ⋮ |

| CURRENT DISCOLORATION VALUE | NUMBER OF TEXTURES |
| --- | --- |
| 3.0〜5.9 | 1 |
| 6.0〜8.9 | 2 |
| 9.0〜11.9 | 3 |
| 12.0〜14.9 | 4 |
| 15.0〜17.9 | 5 |
| 18.0〜20.9 | 6 |
| 21.0〜23.9 | 7 |
| 24.0〜26.9 | 8 |
| 27.0〜29.9 | 9 |
| 30.0〜 | 10 |

| WEATHER | WEATHER COEFFICIENT | COLOR DEPTH COEFFICIENT |
| --- | --- | --- |
| CLEAR | 1.0 | 1.0 |
| CLOUDY | 1.2 | 1.1 |
| RAIN | 2.0 | 1.5 |
| ⋮ | ⋮ | ⋮ |

700

CHARACTER COLORING CONTROL METHOD, GAME DEVICE, AND INFORMATION STORAGE MEDIUM

Japanese Patent Application No. 2005-363895 filed on Dec. 16, 2005, is hereby incorporated by reference in its entirety.

BACKGROUND OF THE INVENTION

The present invention relates to a character coloring control method, a game device, and an information storage medium.

As technology for generating a realistic game image, JP-A-2001-167291 discloses technology in which an underlying texture mapping object OB1 and a discolored mark representation object OB2 on which a discolored mark texture is mapped are provided, and the objects are drawn to overlap while changing the transparency of the discolored mark representation object OB2.

According to the technology disclosed in JP-A-2001-167291, since the objects are drawn using the discolored mark representation object OB2 on which the discolored mark texture is mapped in advance, it is difficult to control discoloration for each portion of the object. Specifically, a portion to be discolored or the type of discolored mark cannot be changed according to the motion of the object.

Therefore, when applying the above technology to a sports game or the like, a problem occurs in which a character is uniformly and monotonously discolored, whereby the provided game image lacks reality to some extent.

SUMMARY

According to one aspect of the invention, there is provided a character coloring control method comprising:

a cause motion detection step of detecting occurrence of a coloring cause motion which is a motion for which a target portion to be discolored of a character which moves in a game space is determined in advance; and a coloring execution step of discoloring the target portion of the character determined for the detected coloring cause motion in response to detection in the cause motion detection step.

According to another aspect of the invention, there is provided a game device comprising:

a cause motion detection section which detects occurrence of a coloring cause motion which is a motion for which a target portion to be discolored of a character which moves in a game space is determined in advance; and a coloring execution section which discolors the target portion of the character determined for the detected coloring cause motion in response to detection by the cause motion detection section.

According to a further aspect of the invention, there is provided a computer-readable information storage medium storing a program for executing the above character coloring control method.

BRIEF DESCRIPTION OF THE SEVERAL VIEWS OF THE DRAWING

FIG. 9 is a view showing a data configuration example of motion control data.

FIG. 10 is a view showing a table configuration example of a discoloration portion determination table.

FIG. 11 is a view showing a data configuration example of discolored mark texture determination data.

FIG. 12 is a view showing a data configuration example of stadium data.

FIG. 13 is a view showing a data configuration example of weather data.

FIG. 17 is a view showing a data configuration example of discolored mark texture determination data according to a modification.

FIG. 18 is a view showing a data configuration example of weather data according to a modification.

DETAILED DESCRIPTION OF THE EMBODIMENT

Figure 1:
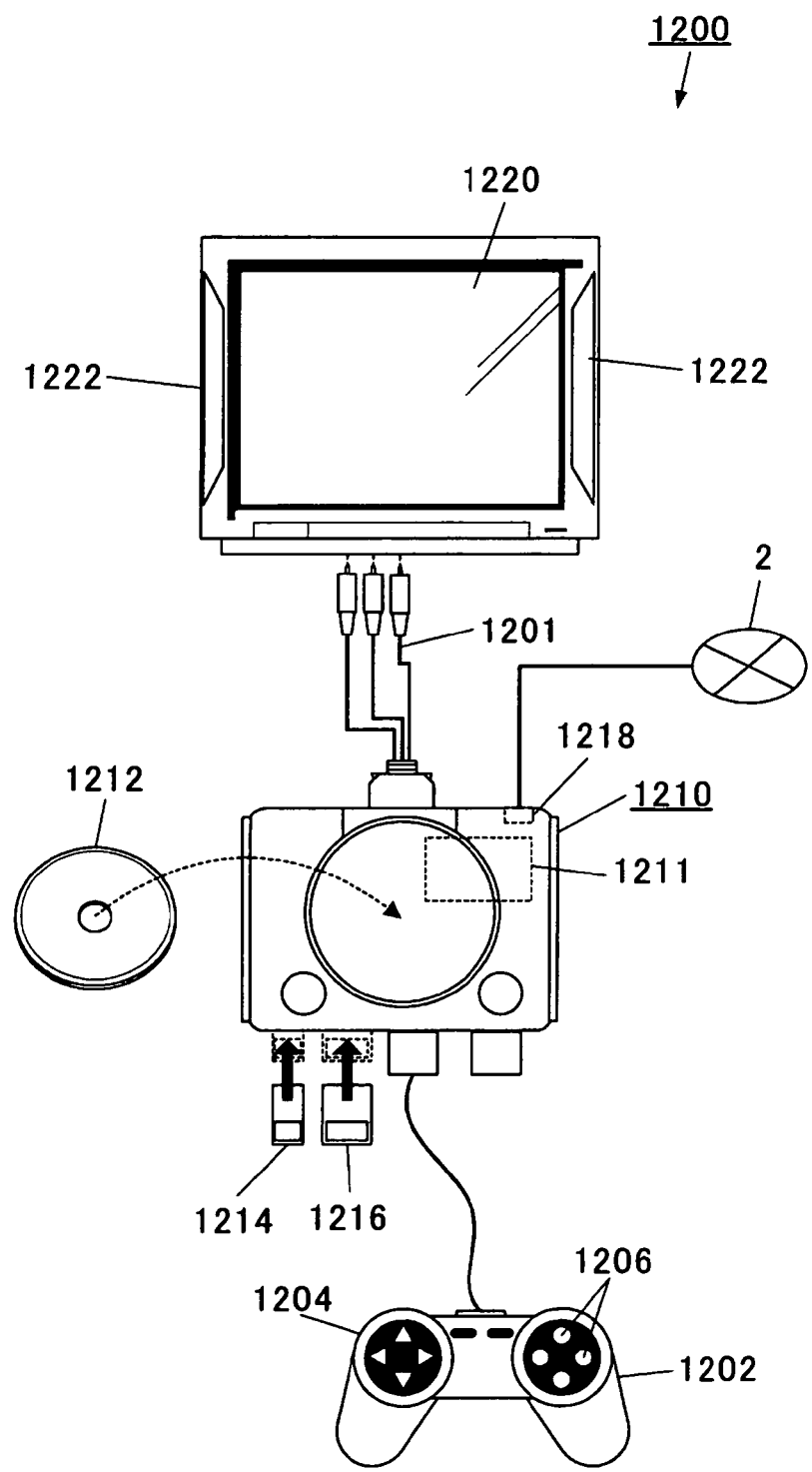
FIG. 1 is an outward appearance view of a consumer game device.

The invention has been achieved to solve the above-described problem. An object of the invention is to provide a realistic game image.

According to one embodiment of the invention, there is provided a character coloring control method comprising:

a cause motion detection step of detecting occurrence of a coloring cause motion which is a motion for which a target portion to be discolored of a character which moves in a game space is determined in advance; and a coloring execution step of discoloring the target portion of the character determined for the detected coloring cause motion in response to detection in the cause motion detection step.

According to another embodiment of the invention, there is provided a game device comprising:

a cause motion detection section which detects occurrence of a coloring cause motion which is a motion for which a target portion to be discolored of a character which moves in a game space is determined in advance; and a coloring execution section which discolors the target portion of the character determined for the detected coloring cause motion in response to detection by the cause motion detection section.

According to the above embodiment, occurrence of the coloring cause motion of the character is detected, and the target portion of the character determined for the detected coloring cause motion is discolored. Therefore, since discoloration is controlled for each discoloration portion of the character and the target portion to be discolored changes according to the motion of the character, a realistic game image is provided.

In the character coloring control method, the coloring execution step may include a depth change control step of changing depth of a color provided to the target portion based on a number of times that the respective target portion is discolored.

According to this configuration, the depth of the color provided to the target portion is changed based on the number of times that the respective target portion is discolored. This makes it possible to increase the depth of the discolored mark as the number of discolorations becomes greater, that is, as the number of coloring cause motions performed by the character becomes greater, whereby a realistic game image is provided.

In the character coloring control method, the depth change control step may be a step of changing the depth of the color provided to the target portion by changing a number of discolored mark textures, of which a discolored mark color is defined by translucent color information, to be mapped.

According to this configuration, the depth of the color provided to the target portion is changed by changing the number of discolored mark textures of which the discolored mark color is defined by the translucent color information. Therefore, the depth of the color provided to the target portion can be easily changed by merely providing one discolored mark texture instead of providing a plurality of discolored mark textures.

The character coloring control method may further comprise a color restoration step of gradually bringing the color of the target portion discolored in the coloring execution step close to the color before the discoloration according to progress of the game.

According to this configuration, the color of the target portion discolored is gradually brought to close to the color before the discoloration according to the progress of the game. This makes it possible to produce a situation in which the discolored mark gradually becomes fainter with time.

In the character coloring control method, the color restoration step may include a color restoration speed changing step of changing speed at which the color of the target portion is brought close to the color before the discoloration according to the progress of the game.

According to this configuration, the speed at which the color of the target portion is brought to close to the color before the discoloration is changed according to the progress of the game. This makes it possible to produce a situation in which the discolored mark is removed to a lesser extent with time by decreasing the speed according to the progress of the game.

The character coloring control method may further comprise an immediate color restoration step of immediately bringing the color of the target portion discolored in the coloring execution step close to the color before the discoloration at a specific timing during the game.

According to this configuration, the color of the target portion discolored is immediately brought to close to the color before the discoloration at a specific timing during the game. Therefore, a situation can be produced in which the discolored mark is immediately removed by the discolored mark removal motion of the character, or the discolored mark is immediately removed by washing away the discolored mark.

The character coloring control method may further comprise:
a reference color setting step of setting a reference discolored mark color of the color provided by the discoloration in the coloring execution step;
wherein the coloring execution step may be a step of discoloring the target portion based on the reference discolored mark color set in the reference color setting step.

The character coloring control method may further comprise:
a space setting step of selecting/setting a game space used for the game from a plurality of game spaces set in advance before starting the game;
wherein the reference color setting step may be a step of setting the reference discolored mark color based on the type of the game space set in the space setting step.

According to the above configuration, the reference discolored mark color provided by the discoloration is set based on the type of the game space set before starting the game, and the character is discolored based on the set reference discolored mark color. This makes it possible to change the color of the discolored mark according to the type of the game space to be set, whereby a more realistic game image is provided.

According to a further embodiment of the invention, there is provided a computer-readable information storage medium storing a program for executing the above character coloring control method.

A case of executing a soccer game using a consumer game device is described below as a mode for carrying out the invention.

1. Game Device

FIG. 1 is a view showing a configuration of a consumer game device 1200 to which this embodiment is applied. The consumer game device 1200 includes a game controller 1202, a main device 1210, and a display 1220 including a speaker 1222. The game controller 1202 is connected with the main device 1210, and the display 1220 is connected with the main device 1210 through a cable 1201 through which an image signal, a sound signal, and the like can be transmitted.

The game controller 1202 includes a direction key 1204 and button switches 1206 which allow a player to input a game operation or a screen display position, and outputs an operation input signal to the main device 1210.

The main device 1210 includes a control unit 1211 provided with a CPU and an IC memory and an information storage medium reading device, and calculates various types of game processing based on a game program and game data read from a CD-ROM 1212 or the like and an operation signal from the game controller 1202 to generate a game screen image signal and a game sound signal.

The main device 1210 generates an image of a virtual three-dimensional space viewed from a given virtual camera. The main device 1210 outputs the image signal and the sound signal to the display 1220 to cause the display 1220 to display a game screen and the speaker 1222 to output game sound. The player enjoys the game by operating the game controller 1202 while watching the game screen displayed on the display 1220.

A program, data, and the like necessary for the main device 1210 to execute the game processing are stored in the CD-ROM 1212, an IC memory 1214, and a memory card 1216 which are information storage media which can be removed from the main device 1210, for example. Or, the main device 1210 connects with a communication line 2 through a communication device 1218 provided in the main device 1210, and downloads the necessary program, data, and the like from an external device (e.g. game server). The term "communication line" used herein means a communication channel through which data can be transferred. Specifically, the communication line 2 includes a communication network such as a LAN using a private line (private cable) for direct connection, Ethernet®, and the like, a telecommunication network, a cable network, and the Internet. The communication method may be a cable communication method or a wireless communication method.

2. Principle

In the soccer game according to this embodiment, a discoloration portion set for each player character which takes part in the game is discolored regardless of whether the player character belongs to a player team or a COM team. As the discoloring method, various methods have been known. In this embodiment, a discolored mark texture which is a texture representing a discolored mark is mapped onto the discoloration portion.

Figure 2A:
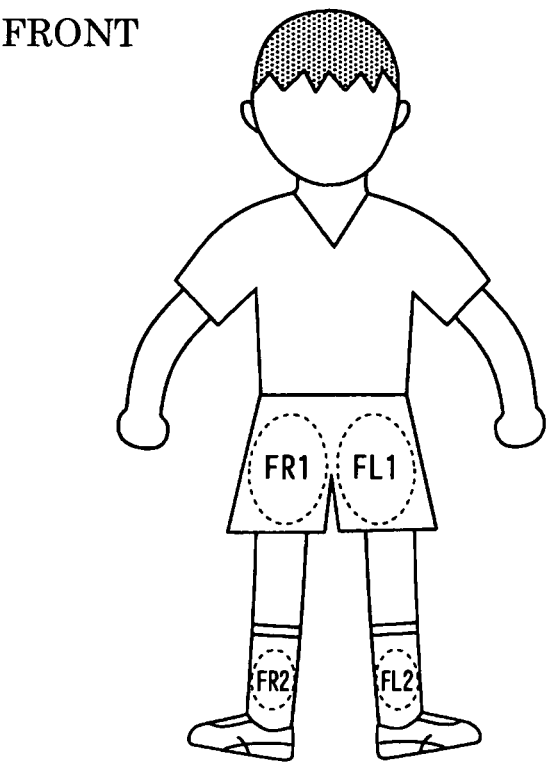
FIG. 2A and FIG. 2B are view illustrative of a discoloration portion.
Figure 2B:
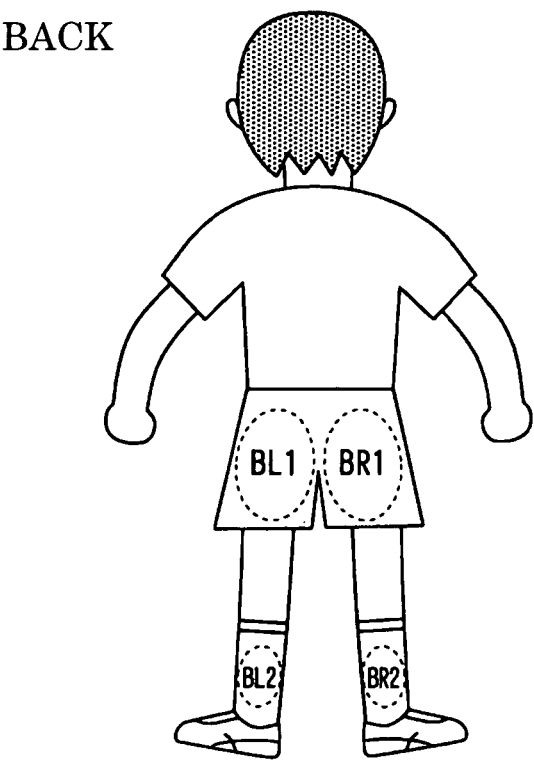

FIG. 2A and FIG. 2B are view illustrative of the discoloration portion.

In this embodiment, eight portions in total of the trunks and the socks of each player character are discolored. The discoloration portions of the trunks are four portions including a front right portion FR1, a front left portion FL1, a back right portion BR1, and a back left portion BL1, and the discoloration portions of the socks are four portions including a front portion FR2 and a back portion BR2 of the right sock and a front portion FL2 and a back portion BL2 of the left sock. In this embodiment, discoloration of these eight discoloration portions is independently controlled.

A portion to be discolored is determined according to the motion of the player character during the game. Note that there is a motion (e.g. passing) which does not cause the discoloration portion to be discolored. A motion of the player character which causes at least one discoloration portion to be discolored is hereinafter called a discoloring motion.

Figure 3:
FIG. 3 is a view showing an example of a discoloring motion.
Figure 4:
FIG. 4 is a view showing another example of a discoloring motion.
Figure 5:
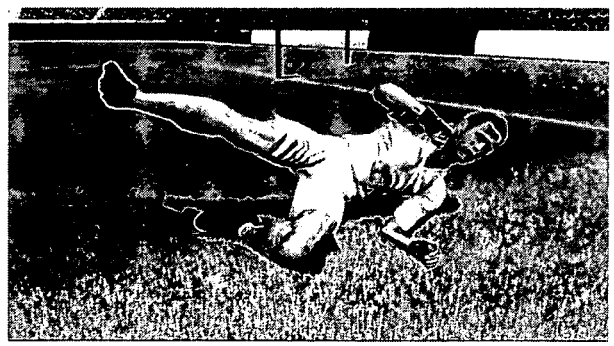
FIG. 5 is a view showing a further example of a discoloring motion.

FIGS. 3 to 5 are views showing examples of the discoloring motion.

FIG. 3 shows a discoloring motion in which the player character slides in with the left leg bent and the right leg extended. In this discoloring motion, the back right portion BR1 and the back left portion BL1 of the trunks, the back portion BR2 of the right sock, and the front portion FL2 of the left sock in contact with the ground are discolored among the eight discoloration portions set for the player character.

FIG. 4 is a view showing a discoloring motion in which the player character falls down on his knees. In this discoloring motion, the front right portion FR1 and the front left portion FL1 of the trunks are discolored. Since the socks do not contact the ground, the socks are not discolored.

FIG. 5 shows a discoloring motion in which a goalkeeper jumps sideways and falls down. In this discoloring motion, the back left portion BL1 of the trunks and the back portion BL2 of the left sock are discolored.

The discolored marks are classified into 10 levels according to a current discoloration value which is a parameter indicating the degree of the current discoloration. In more detail, a discolored mark at the first level is used when the current discoloration value is 3.0 to 5.9, a discolored mark at the second level is used when the current discoloration value is 6.0 to 8.9, a discolored mark at the ninth level is used when the current discoloration value is 27.0 to 29.9, and a discolored mark at the tenth level is used when the current discoloration value is 30.0 or more. A discolored mark is not provided when the current discoloration value is 0 to 2.9.

Specifically, ten discolored mark textures with different discolored mark patterns are provided, and the discolored mark texture to be mapped is replaced with another discolored mark texture according to the current discoloration value of the discoloration portion. A discolored mark texture is provided of which the discolored mark pattern is smaller and thinner at a lower level and is larger and denser at a higher level. The depth of the color of the discolored mark pattern is increased as the level becomes higher.

The current discoloration value is calculated for each discoloration portion, and is increased and updated by a discoloration unit which is the unit of an increase in the degree of discoloration each time the discoloring motion is performed. The discoloration unit is calculated by the following expression (1).

$$\text{Discoloration unit} = \text{stadium coefficient} \times \text{weather coefficient} \quad (1)$$

The stadium coefficient is a coefficient which differs depending on the stadium in which the game is performed. A high stadium coefficient is assigned to a stadium with a pitch (e.g. ground pitch) which causes the player character to be easily discolored. The weather coefficient is a coefficient which differs depending on the game day weather. A high weather coefficient is assigned to weather (e.g. rain) which causes the player character to be easily discolored. Therefore, when the game is performed in bad weather in a stadium with a pitch which causes the player character to be easily discolored, the value added to the current discoloration value upon one discoloring motion is increased due to an increase in the discoloration unit.

In this embodiment, the color of the discolored mark provided is changed according to the stadium in which the game is performed. For example, a green discolored mark is used when the game is performed in a stadium with a natural turf pitch, and a brown discolored mark is used when the game is performed in a stadium with a ground pitch. Specifically, the color of the discolored mark pattern of the discolored mark texture is changed without changing the position and shape of the discolored mark pattern. This allows the player character to be provided with a discolored mark of the same color as that of the pitch of the stadium, whereby a more realistic game image is provided.

The discoloring principle has been described above. In the actual soccer game, the discolored mark may become fainter with time. In this embodiment, the latest time (hereinafter called "latest discoloration time") when the discolored mark is provided to each discoloration portion is stored for each discoloration portion, and the current discoloration value of the discoloration portion is decreased and updated each time a specific time (e.g. five minutes in the game time) has elapsed from the latest discoloration time.

In more detail, a subtraction coefficient is determined when the update time is reached based on the time elapsed after starting the game, and the product of the subtraction coefficient and the current discoloration value is subtracted from the current discoloration value. In the actual game image, the discolored mark provided to the discoloration portion becomes fainter with time, whereby the original color of the trunks or socks gradually appears. This produces a situation in which the discolored mark gradually becomes fainter with time.

Figure 6:
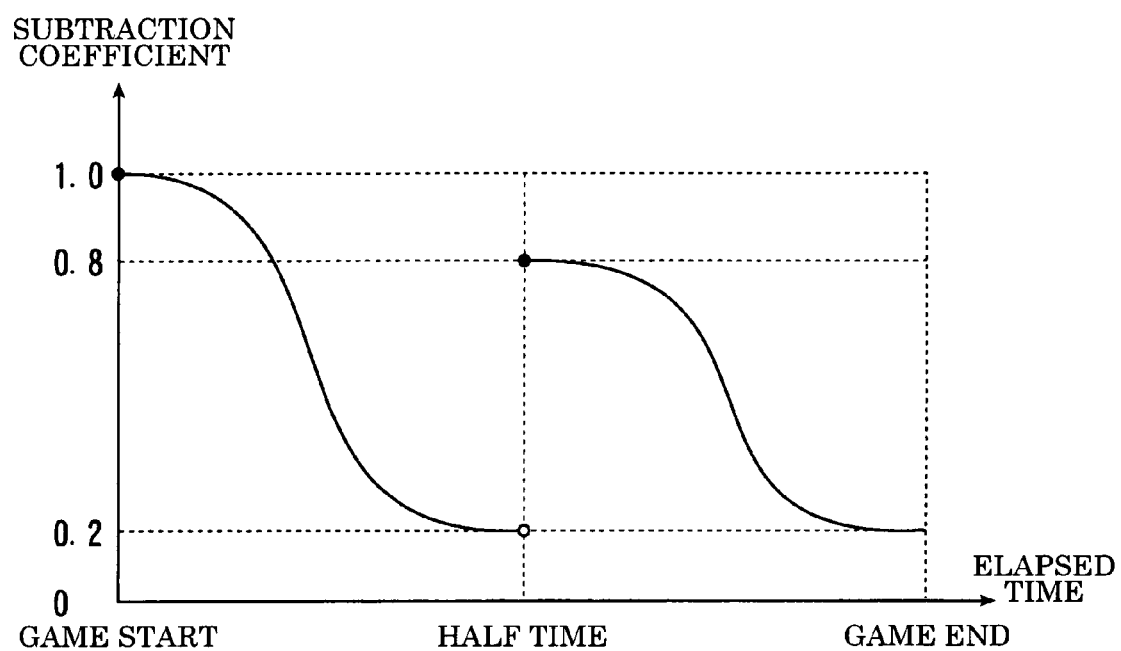
FIG. 6 is a graph showing the relationship between elapsed time and a subtraction coefficient.

FIG. 6 is a graph showing the relationship between the elapsed time and the subtraction coefficient. In FIG. 6, the horizontal axis indicates the elapsed time, and the vertical axis indicates the subtraction coefficient.

When the elapsed time is short, the value subtracted from the current discoloration value is large since the subtraction coefficient is large. The subtraction coefficient is reduced as the elapsed time becomes closer to half time, whereby the value subtracted from the current discoloration value is reduced. Specifically, since the player sweats to only a small extent at the beginning of the game, a discolored mark is easily removed. On the other hand, since the amount a player sweats gradually increases with time, a discolored mark is not easily removed. This produces a situation in which a discolored mark is removed to a lesser extent with time.

The subtraction coefficient is increased immediately after half time since the player stops sweating. The subtraction coefficient is again reduced toward the end of the game. In other words, the discolored mark removal speed changes due to the change in the subtraction coefficient.

The player may remove the discolored mark on the trunks and socks or wash away the discolored mark at half time. In this embodiment, the current discoloration value of each discoloration portion is reduced by ½ at half time.

3. Functional Configuration

A functional configuration of the consumer game device 1200 is described below.

Figure 7:
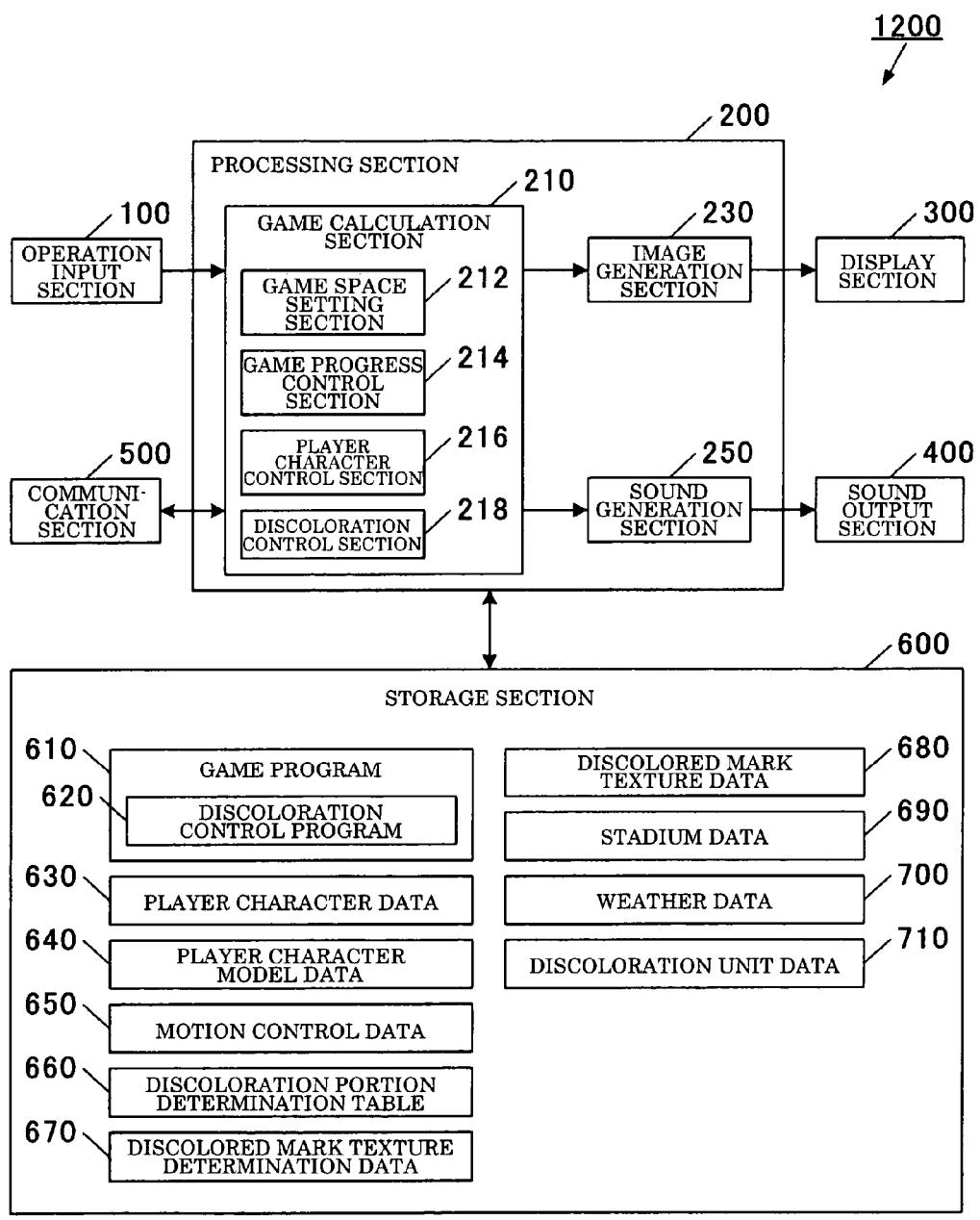
FIG. 7 is a block diagram showing a functional configuration of a consumer game device.

FIG. 7 is a block diagram showing a functional configuration of the consumer game device 1200. The consumer game device 1200 includes an operation input section 100, a processing section 200, a display section 300, a sound output section 400, a communication section 500, and a storage section 600.

The operation input section 100 is implemented using a button switch, a lever, a dial, a mouse, a keyboard, various sensors, and the like, and outputs an operation input signal corresponding to the operation input by the player to the processing section 200. In FIG. 1, the game controller 1202 corresponds to the operation input section 100.

The processing section 200 performs various calculations such as controlling the entire consumer game device 1200, proceeding with the game, and generating an image. This function is implemented using a processing device such as a CPU (CISC or RISC) or an ASIC (e.g. gate array) and its control program, for example. In FIG. 1, the control unit 1211 included in the main device 1210 corresponds to the processing section 200.

The processing section 200 includes a game calculation section 210 which mainly performs game calculations, an image generation section 230 which generates an image of a game space viewed from a given view point such as a virtual camera and generates an image signal for displaying a game screen based on various types of data calculated by the game calculation section 210, and a sound generation section 250 which generates game sound such as effect sound and background music (BGM) and generates a sound signal for outputting the game sound.

The game calculation section 210 executes the game processing based on the operation input signal from the operation input section 100 and a game program 610 and various types of data read from the storage section 600. In this embodiment, the game calculation section 210 includes a game space setting section 212, a game progress control section 214, a player character control section 216, and a discoloration control section 218.

The game space setting section 212 sets a game space by disposing an object such as a player character in a virtual three-dimensional space. The game progress control section 214 controls the progress of the game by measuring the game start time and the elapsed time. The player character control section 216 controls the movement and the motion of the player character during the game. The discoloration control section 218 controls discoloration of each discoloration portion of the player character.

The image generation section 230 is implemented using a calculation device such as a CPU or DSP and its control program, a drawing frame IC memory such as a frame buffer, and the like. The image generation section 230 generates a game image (3D CG image) for displaying a game screen by performing geometric transformation, shading, and the like based on the calculation results from the game calculation section 210, and outputs an image signal of the generated image to the display section 300. In this embodiment, the image generation section 230 maps a discolored mark texture onto the discoloration portion of the player character under control of the discoloration control section 218.

The display section 300 displays a game screen based on the image signal from the image generation section 230 while redrawing the screen of one frame every 1/60 second, for example. This function is implemented using hardware such as a CRT, LCD, ELD, PDP, or HMD. In FIG. 1, the display 1220 corresponds to the display section 300.

The sound generation section 250 is implemented using a calculation device such as a CPU or DSP and its control program. The sound generation section 250 generates game sound such as effect sound and BGM used during the game, and outputs a sound signal of the generated game sound to the sound output section 400.

The sound output section 400 outputs game sound such as BGM and effect sound based on the sound signal from the sound generation section 250. This function is implemented using a speaker or the like. In FIG. 1, the speaker 1222 corresponds to the sound output section 400.

The communication section 500 connects with the communication line 2 and performs data communication with an external device according to the control signal from the processing section 200. The communication section 500 is implemented using a wireless communication module, a modem, a TA, a jack for a communication cable, a control circuit, or the like. In FIG. 1, the communication device 1218 corresponds to the communication section 500.

The storage section 600 stores a system program (not shown) for causing the processing section 200 to implement the functions for integrally controlling the consumer game device 1200, and a program and data necessary for the processing section 200 to execute the game. The storage section 600 temporarily stores various programs and data necessary for the processing section 200 to execute calculations. The function of the storage section 600 is implemented using an information storage medium such as an IC memory, memory card, hard disk, CD-ROM, MO, or DVD. In FIG. 1, the IC memory provided in the control unit 1211, the CD-ROM 1212, the IC memory 1214, the memory card 1216, and the like correspond to the storage section 600.

In this embodiment, the storage section 600 includes a game program 610, player character data 630, player character model data 640, motion control data 650, a discoloration portion determination table 660, discolored mark texture determination data 670, discolored mark texture data 680, stadium data 690, weather data 700, and discoloration unit data 710. The game program 610 includes a discoloration control program 620 for causing the game calculation section 210 to function as the discoloration control section 218 as a subroutine.

Figure 8:
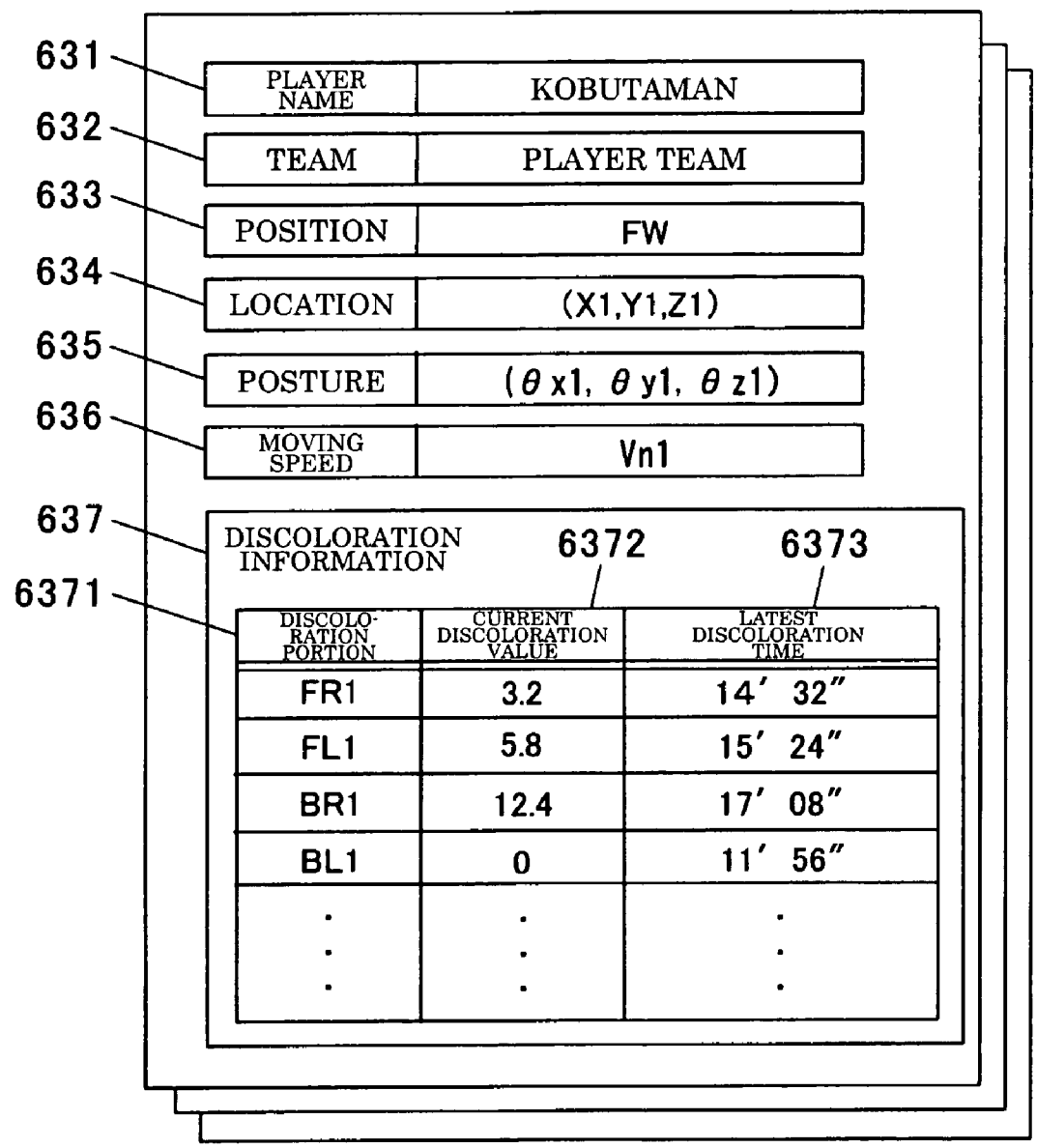
FIG. 8 is a view showing a data configuration example of player character data.

The player character data 630 is data on the player character. FIG. 8 shows a data configuration example of the player character data 630. The player character data 630 is provided for each player character, in which a player name 631, a team 632, a position 633, a location 634, a posture 635, a moving speed 636, and discoloration information 637 are stored while being associated with the player character.

The discoloration information 637 is information on discoloration of the player character, in which a discoloration portion 6371, a current discoloration value 6372, and a latest discoloration time 6373 are stored while being associated with one another. The discoloration portion 6371 corresponds to the eight discoloration portions FR1 to BL2 shown in FIG. 2A and FIG. 2B. For example, 12.4 is stored as the current discoloration value of the back right portion BR1 of the trunks, and 17:08 is stored as the latest discoloration time of the back right portion BR1 of the trunks.

The player character model data 640 includes modeling data for modeling the player character in the game space and texture data. The texture data of the trunks and socks of the player character is also included in the player character model data 640.

The motion control data 650 is data for controlling the motion of the character. FIG. 9 shows a data configuration example of the motion control data 650. In the motion control data 650, a motion type 651 which is the type of motion and a motion control content 652 which is a specific control content of the motion are stored while being associated with each other. For example, the control content of motion "sliding 01" is "sliding in with the left leg bent and the right leg extended".

The discoloration portion determination table 660 is a table for determining the discoloration portion. FIG. 10 shows a table configuration example of the discoloration portion determination table 660. In the discoloration portion determination table 660, the discoloration portion to which the discolored mark is provided is indicated by a circle, and the discoloration portion to which the discolored mark is not provided is indicated by a cross for each motion stored in the motion control data 650. For example, when the player character has performed the motion "sliding 01", the discolored marks are provided to the discoloration portions BR1, BL1, FL2, and BR2.

In the game processing, the game calculation section 210 controls the motion of the player character based on the motion control data 650. When the game calculation section 210 has determined that the discoloring motion has been performed, the game calculation section 210 determines the discoloration portion to which the discolored mark is provided as a result of the discoloring motion based on the discoloration portion determination table 660. The game calculation section 210 updates the current discoloration value 6372 of the corresponding discoloration portion 6371 of the player character data 630, and updates the latest discoloration time 6373 with the current game time.

The discolored mark texture determination data 670 is data for determining the texture mapped onto the discoloration portion. FIG. 11 shows a data configuration example of the discolored mark texture determination data 670. In the discolored mark texture determination data 670, a current discoloration value 671 and a texture type 672 which is the type of texture are stored while being associated with each other. For example, when the current discoloration value is 15.0 to 17.9, a discolored mark texture 05 is mapped onto the discoloration portion.

When the current discoloration value 6372 of the discoloration portion 6371 stored in the player character data 630 has been updated in the game processing, the discoloration control section 218 specifies the texture type 672 corresponding to the updated current discoloration value, and causes the image generation section 230 to map the discolored mark texture of the specified texture type 672 (discoloration control processing).

The discolored mark texture data 680 is data in which the discolored mark textures are stored. Ten discolored mark textures from a discolored mark texture 01 with the lowest degree of discoloration to a discolored mark texture 10 with the highest degree of discoloration are stored in the discolored mark texture data 680.

The stadium data 690 is data on the stadium in which the game is performed. FIG. 12 shows a data configuration example of the stadium data 690. In the stadium data 690, a stadium name 691, a pitch type 692 which is the type of pitch, a stadium coefficient 693, and a discolored mark color 694 which is the color of the discolored mark texture are stored while being associated with one another. For example, the pitch of the stadium "riverbed" is ground, and the stadium coefficient is 2.0. The color of the discolored mark texture is brown.

The weather data 700 is data on the weather. FIG. 13 shows a data configuration example of the weather data 700. In the weather data 700, a weather 701 and a weather coefficient 702 are stored while being associated with each other. For example, the weather coefficient of the weather "cloudy" is 1.2. In the discoloration unit data 710, the discoloration unit calculated from the stadium coefficient 693 and the weather coefficient 702 and the discolored mark color 694 set based on the stadium are stored.

In the game processing, the game calculation section 210 specifies the stadium coefficient 693 and the weather coefficient 702 based on the stadium determined according to the player's operation input and the weather set at random, and calculates the discoloration unit according to the expression (1). The game calculation section 210 specifies the discolored mark color 694 corresponding to the stadium determined, and stores the discoloration unit and the discolored mark color 694 in the discoloration unit data 710. The game calculation section 210 updates the current discoloration value 6372 based on the stored discoloration unit, and controls to map the discolored mark texture of the discolored mark color 694 onto the discoloration portion.

4. Flow of Processing

The flow of processing is described below.

Figure 14:
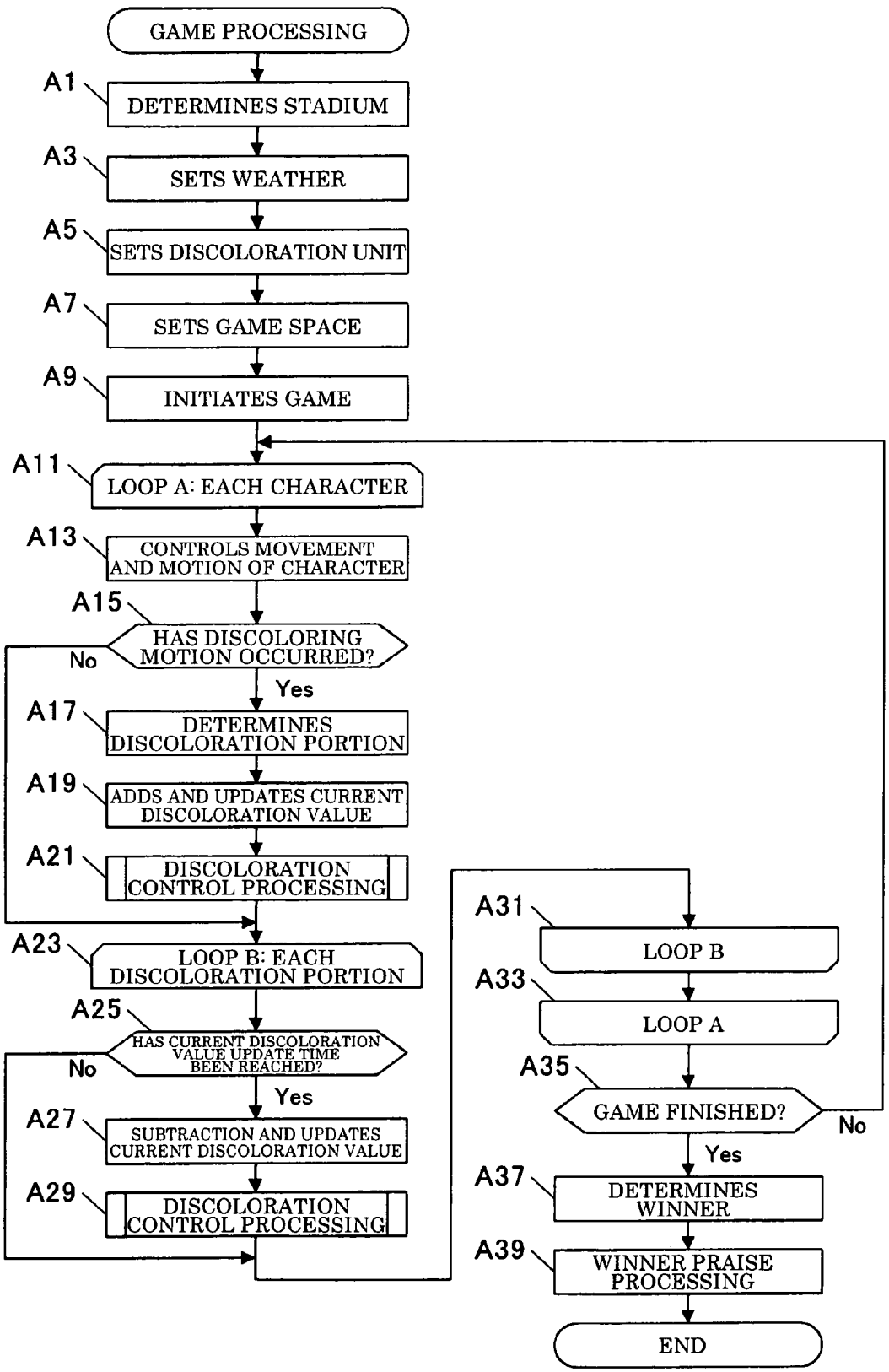
FIG. 14 is a flowchart showing the flow of game processing.

FIG. 14 is a flowchart showing the flow of the game processing. This processing is implemented by causing the game calculation section 210 to execute the game program 610.

The game calculation section 210 determines the stadium in which the game is performed according to the player's operation input (step A1). The game calculation section 210 randomly sets the game day weather (step A3).

The game calculation section 210 specifies the stadium coefficient 693 and the weather coefficient 702 based on the stadium determined in the step A1 and the weather set in the step A3, and calculates the discoloration unit according to the expression (1). The game calculation section 210 specifies the discolored mark color 694 corresponding to the stadium determined in the step A1, and stores the discoloration unit and the discolored mark color 694 in the discoloration unit data 710 to set the discoloration unit (step A5).

The game space setting section 212 sets the game space by disposing an object such as the player character in the virtual three-dimensional space (step A7). The game progress control section 214 initiates the game and starts measuring the game time (step A9).

The game calculation section 210 repeatedly executes the processing of the loop A for each player character (steps A11 to A33).

In the loop A, the player character control section 216 controls the movement and the motion of the character (step A13). In more detail, the player character control section 216 controls the player character according to the player's operation input when dealing with a player's character, and performs AI control according to a specific control routine when dealing with a COM character.

The game calculation section 210 determines whether or not the discoloring motion has been performed by the player character (step A15). When the game calculation section 210 has determined that the discoloring motion has not been performed (step A15: No), the game calculation section 210 performs the processing in step A23. When the game calculation section 210 has determined that the discoloring motion has been performed (step A15: Yes), the game calculation section 210 determines the discoloration portion to which the discolored mark is provided based on the discoloration portion determination table 660 (step A17).

The game calculation section 210 then updates the current discoloration value 6372 of the discoloration portion determined in the step A17 by adding the discoloration unit to the current discoloration value 6372 stored in the player character data 630 (step A19).

The discoloration control section 210 performs the discoloration control processing by executing the discoloration control program 620 (step A21). In more detail, the discoloration control section 210 specifies the texture type 672 corresponding to the updated current discoloration value 6372, and causes the image generation section 230 to map the discolored mark texture of the specified texture type 672. The discolored mark texture to be mapped is colored with the discolored mark color 694 stored in the discoloration unit data 710.

The game calculation section 210 repeatedly executes the processing of the loop B for each discoloration portion (steps A23 to A31).

In the loop B, the game calculation section 210 determines whether or not the update time has been reached at which the current discoloration value of the discoloration portion is updated (step A25). The update time occurs when five minutes has elapsed from the latest discoloration time 6373 of the discoloration portion and at half time.

The game calculation section 210 determines the subtraction coefficient from the graph shown in FIG. 6 based on the time elapsed until the update time is reached after starting the game, and subtracts the product of the subtraction coefficient and the current discoloration value from the current discoloration value to update the current discoloration value (step A27). When the update time is the game's half time, the current discoloration value of each discoloration portion is reduced by ½.

The discoloration control section 218 performs the discoloration control processing by executing the discoloration control program 620 (step A29). The processing of the loop A and the loop B is executed in this manner.

The game calculation section 210 determines whether or not the game's full time has been reached (step A35). When the game calculation section 210 has determined that the game's full time has not been reached (step A35: No), the game calculation section 210 returns to the step A11. When the game calculation section 210 has determined that the game's full time has been reached (step A35: Yes), the game calculation section 210 determines the winner (step A37), performs winner praise processing of praising the winner (step A39), and finishes the game processing.

5. Hardware Configuration

A hardware configuration which can implement the consumer game device 1200 is described below.

Figure 15:
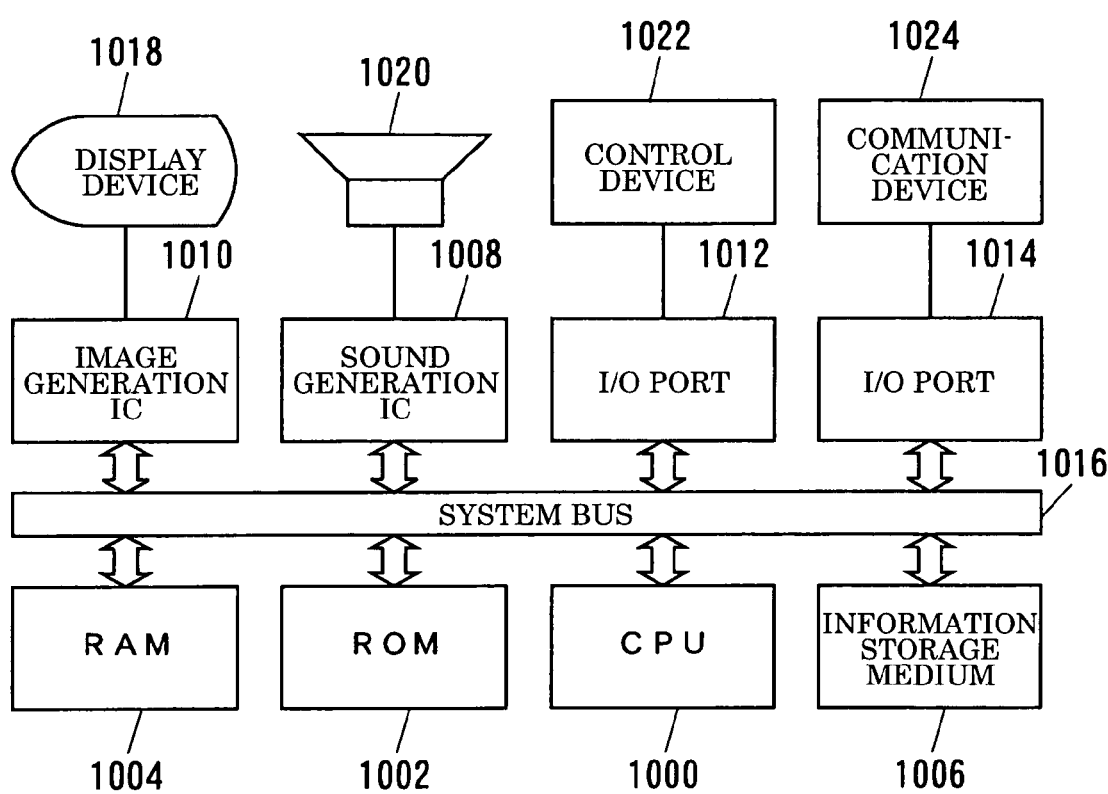
FIG. 15 is a view showing a hardware configuration example of a consumer game device.

FIG. 15 is a view showing an example of a hardware configuration according to this embodiment. The consumer game device 1200 includes a CPU 1000, a ROM 1002, a RAM 1004, an information storage medium 1006, a sound generation IC 1008, an image generation IC 1010, and I/O ports 1012 and 1014. These sections are connected so that data can be input and output through a system bus 1016.

The CPU 1000 controls the entire device and performs various types of data processing according to a program stored in the information storage medium 1006, a system program stored in the ROM 1002, an operation input signal input from a control device 1022, and the like. The CPU 1000 is provided in the control unit 1211 of the main device 1210 shown in FIG. 1, and corresponds to the processing section 200 shown in FIG. 7.

The ROM 1002, the RAM 1004, and the information storage medium 1006 correspond to the storage section 600 shown in FIG. 7. In more detail, the ROM 1002 corresponds to the IC memory provided in the control unit 1211 of the main device 1210 shown in FIG. 1, and stores a program and data (e.g. system program) for controlling the main device 1210.

The RAM 1004 is a storage means used as a work area for the CPU 1000, and stores a given content of the information storage medium 1006 and the ROM 1002 or the calculation results of the CPU 1000.

The information storage medium 1006 is implemented using an IC memory, a removable hard disk unit, an MO, a DVD-ROM, or the like. The information storage medium 1006 corresponds to the CD-ROM 1212, the IC memory 1214, and the memory card 1216 shown in FIG. 1.

The sound generation IC 1008 is an integrated circuit which generates game sound such as effect sound and BGM based on the information stored in the ROM 1002 and the information storage medium 1006. The generated sound is output from the speaker 1020. The speaker 1020 corresponds to the sound output section 400 shown in FIG. 7 and the speaker 1222 shown in FIG. 1.

The image generation IC 1010 is an integrated circuit which generates pixel information for outputting an image to the display device 1018. The image generation section 230 shown in FIG. 7 corresponds to the image generation IC 1010. The display device 1018 corresponds to the display section 300 shown in FIG. 7 and the display 1220 shown in FIG. 1.

The control device 1022 is connected with the I/O port 1012, and a communication device 1024 is connected with the I/O port 1014.

The control device 1022 corresponds to the operation input section 100 shown in FIG. 7 and the game controller 1202 shown in FIG. 1. The control device 1022 is a device for the player to input various types of game operation. The communication device 1024 exchanges various types of information utilized in the game device with the outside. The communication device 1024 is connected with another game device, and is utilized to transmit and receive given information corresponding to the game program and to transmit and receive information such as the game program through a communication line. The communication section 500 shown in FIG. 7 and the communication device 1218 shown in FIG. 1 correspond to the communication device 1024.

The processing executed by the image generation IC 1010, the sound generation IC 1008, and the like may be executed by means of software using the CPU 1000, a general-purpose DSP, or the like.

This embodiment may be applied not only to the consumer game device 1200 shown in FIG. 1, but also to various devices such as an arcade game device, a portable game device, a general-purpose computer such as a personal computer, or a large-scale attraction device in which a number of players participate.

Figure 16:
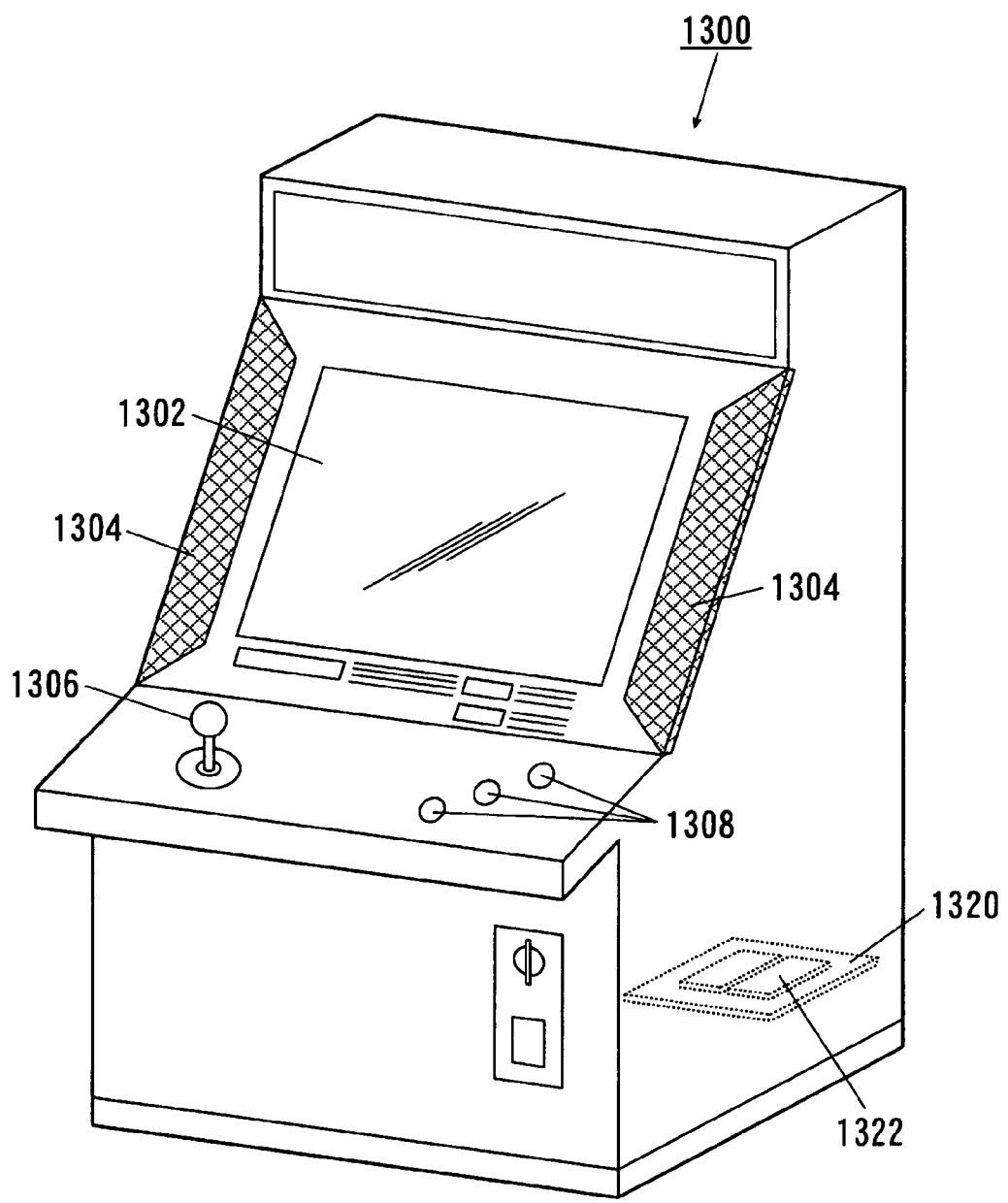
FIG. 16 is an outward appearance view of a consumer game device.

FIG. 16 is a view showing an example of the outward appearance when applying this embodiment to an arcade game device 1300. The arcade game device 1300 includes a display 1302 which displays a game screen, a speaker 1304 which outputs game effect sound and BGM, a joystick 1306 which inputs forward/backward/left/right directions, a pushbutton 1308, and a control unit 1320 which integrally controls the arcade game device 1300 through calculations and executes a given game.

The control unit 1320 includes a processing device such as a CPU 1324, and a ROM 1322 which stores a program and data necessary for controlling the arcade game device 1300 and executing the game. The CPU provided in the control unit 1320 executes various types of processing by arbitrarily reading the program and data from the ROM 1322 and performing calculations. The player enjoys the game by inputting a game operation using the joystick 1306 and the pushbutton 1308 while watching the game screen displayed on the display 1302.

This embodiment may be applied not only to a game executed using a stand-alone device, but also to a game called a network game. As examples of the system configuration which implements the network game, (1) a configuration in which a personal computer, a consumer game system, or the like installed in the home is used as a game terminal, and the game terminal is connected with a server through a cable/wireless communication line such as an Internet network or a private line network, (2) a configuration in which two or more game terminals are connected through a communication line without using a server, (3) a configuration in which two or more game terminals are connected through a communication line and one of the game terminals has a server function, (4) a configuration in which two or more game terminals are physically connected to form one system (e.g. arcade game system), and the like can be given.

6. Effects

According to this embodiment, whether or not the discoloring motion has been performed by the player character is determined, and the discoloration portion set for the determined discoloring motion is discolored. A discolored mark texture of which the discolored mark pattern is denser and of a thicker color is mapped as the current discoloration value set for the discoloration portion becomes larger. Therefore, since discoloration is controlled for each discoloration portion of the player character and the discoloration portion to be discolored changes according to the motion of the player character, a realistic game image is provided.

The current discoloration value is updated according to the discoloration unit set based on the stadium in which the game is performed and the game day weather. This allows the degree of discoloration to be changed based on the type of stadium pitch and the pitch state depending on the weather, whereby a more realistic game image is provided.

Moreover, the current discoloration value of each discoloration portion is reduced based on the time elapsed from the latest discoloration time of the discoloration portion, and the current discoloration value of each discoloration portion is reduced by ½ at half time. Therefore, a situation is accurately produced in which the discolored mark gradually becomes fainter with time or the discolored mark is removed by the player character during half time.

7. Modification 7-1. Number of Discolored Mark Textures

This embodiment has been described above in which the type of discolored mark texture to be mapped is changed according to the current discoloration value of the discoloration portion. Note that the number of discolored mark textures to be mapped may be changed according to the current discoloration value. Specifically, a discolored mark texture in which a translucent discolored mark pattern is drawn is provided, and the number of discolored mark textures to be mapped is increased as the current discoloration value becomes larger. In this case, a texture count 673 may be stored in the discolored mark texture determination data 670 instead of the texture type 672 (see FIG. 17), and the discolored mark textures of the texture count 673 corresponding to the current discoloration value 671 of the discoloration portion may be mapped.

7-2. Depth of Discolored Mark Texture

This embodiment has been described above in which the color of the discolored mark texture to be mapped is changed according to the stadium in which the game is performed. Note that the depth of the discolored mark texture to be mapped may be changed according to the game day weather. For example, a thicker discolored mark texture is mapped as the weather becomes worse. In this case, a color depth coefficient 703 may be additionally stored in the weather data 700 (see FIG. 18), and the discolored mark texture may be mapped according to the color depth coefficient 703 corresponding to the game day weather 701.

7-3. Discoloration Portion

This embodiment has been described above in which the eight portions of the trunks and socks of the player character are discolored in total. Note that the discoloration portions can be arbitrarily changed. For example, the uniform of the player character may be discolored, or the skin of the player character may be discolored.

7-4. Discoloration with Time

The player character may be discolored with time instead of discoloring the player character according to the motion of the player character. For example, the player character is discolored so that sweat gradually adheres to the uniform of the player character with time. An object other than the player character may be discolored. For example, a soccer ball is gradually discolored with time.

7-5. Value Added to Current Discoloration Value

This embodiment has been described above in which the value added to the current discoloration value per motion is the same for all motions. Note that the value added to the current discoloration value may be changed depending on the type of motion. For example, the value added to the current discoloration value is set at "discoloration unit×2" when the motion "sliding 01" has been performed, and set at "discoloration unit×3" when the motion "sliding 03" has been performed. The value added to the current discoloration value may be changed according to the position of the player character.

7-6. Removal of Discolored Mark

The discolored mark may be removed according to the motion of the player character during the game. For example, when the player character has performed a motion of removing the discolored mark on the trunks, the discolored mark on the trunks is removed. In this case, a discolored mark removal motion is additionally stored in the motion control data 650 shown in FIG. 9, and a discolored mark removal unit is set in addition to the discoloration unit. The current discoloration value is subtracted and updated by the discolored mark removal unit each time the discolored mark removal motion is performed by the player character.

7-7. Discoloring Method

The character may be discolored by shading instead of discoloring the character by mapping the discolored mark texture. In this case, color information of a pixel corresponding to the discoloration portion may be changed corresponding to the current discoloration value.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A character coloring control method comprising:
   a cause motion detection step of detecting occurrence of a coloring cause motion which is a motion for which a target portion to be discolored of a character which moves in a game space is determined in advance, the coloring cause motion being performed by a processor or a controller; and
   a coloring execution step of discoloring the target portion of the character determined for the detected coloring cause motion in response to detection in the cause motion detection step.

2. The character coloring control method as defined in claim 1,
   wherein the coloring execution step includes a depth change control step of changing depth of a color provided to the target portion based on a number of times that the respective target portion is discolored.

3. The character coloring control method as defined in claim 2,
   wherein the depth change control step is a step of changing the depth of the color provided to the target portion by changing a number of discolored mark textures, of which a discolored mark color is defined by translucent color information, to be mapped.

4. The character coloring control method as defined in claim 1, further comprising a color restoration step of gradually bringing the color of the target portion discolored in the coloring execution step close to the color before the discoloration according to progress of the game.

5. The character coloring control method as defined in claim 4,
   wherein the color restoration step includes a color restoration speed changing step of changing speed at which the color of the target portion is brought close to the color before the discoloration according to the progress of the game.

6. The character coloring control method as defined in claim 1, further comprising an immediate color restoration step of immediately bringing the color of the target portion discolored in the coloring execution step close to the color before the discoloration at a specific timing during the game.

7. The character coloring control method as defined in claim 1, further comprising:
   a reference color setting step of setting a reference discolored mark color of the color provided by the discoloration in the coloring execution step;
   wherein the coloring execution step is a step of discoloring the target portion based on the reference discolored mark color set in the reference color setting step.

8. The character coloring control method as defined in claim 7, further comprising:
   a space setting step of selecting/setting a game space used for the game from a plurality of game spaces set in advance before starting the game;
   wherein the reference color setting step is a step of setting the reference discolored mark color based on the type of the game space set in the space setting step.

9. A game device comprising:
   a cause motion detection section which detects occurrence of a coloring cause motion which is a motion for which a target portion to be discolored of a character which moves in a game space is determined in advance; and
   a coloring execution section which discolors the target portion of the character determined for the detected coloring cause motion in response to detection by the cause motion detection section.

10. The game device as defined in claim 9,
    wherein the coloring execution section includes a depth change control section which changes depth of a color provided to the target portion based on a number of times that the respective target portion is discolored.

11. The game device as defined in claim 10,
    wherein the depth change control section changes the depth of the color provided to the target portion by changing a number of discolored mark textures, of which a discolored mark color is defined by translucent color information, to be mapped.

12. The game device as defined in claim 9, further comprising a color restoration section which gradually brings the color of the target portion discolored by the coloring execution section close to the color before the discoloration according to progress of the game.

13. The game device as defined in claim 12,
    wherein the color restoration section includes a color restoration speed changing section which changes speed at which the color of the target portion is brought close to the color before the discoloration according to the progress of the game.

14. The game device as defined in claim 9, further comprising an immediate color restoration section which immediately brings the color of the target portion discolored by the coloring execution section close to the color before the discoloration at a specific timing during the game.

15. The game device as defined in claim 9, further comprising:
    a reference color setting section which sets a reference discolored mark color of the color provided by the discoloration of the coloring execution section;

wherein the coloring execution section discolors the target portion based on the reference discolored mark color set by the reference color setting section.

16. The game device as defined in claim 15, further comprising:
a space setting section which selects/sets a game space used for the game from a plurality of game spaces set in advance before starting the game;
wherein the reference color setting section sets the reference discolored mark color based on the type of the game space set by the space setting section.

17. A computer-readable information storage medium storing a program for executing the character coloring control method as defined in claim 1.

* * * * *